(12) United States Patent
Romanelli et al.

(10) Patent No.: US 9,120,399 B2
(45) Date of Patent: Sep. 1, 2015

(54) MANUFACTURE OF AN ARTICLE HAVING AN EDGE WRAPPED DECORATIVE COVERING OVERLYING A SUBSTRATE

(71) Applicant: International Automotive Components Group North America, Inc., Southfield, MI (US)

(72) Inventors: Chad Romanelli, Macomb, MI (US); Neil A. Hull, Birmingham, MI (US); David VanHorn, Farmington Hills, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 91 days.

(21) Appl. No.: 14/092,558

(22) Filed: Nov. 27, 2013

(65) Prior Publication Data

US 2015/0147515 A1    May 28, 2015

(51) Int. Cl.
*B68G 7/052* (2006.01)
*B60N 3/04* (2006.01)
(52) U.S. Cl.
CPC ...................................... *B60N 3/042* (2013.01)
(58) Field of Classification Search
CPC ....................................................... B68G 7/052
USPC ........... 428/68, 71, 73, 76, 125–128; 29/91.1, 29/91.5; 156/216
See application file for complete search history.

(56) References Cited

U.S. PATENT DOCUMENTS

| 5,318,647 | A | 6/1994 | Mitchell |
| 6,136,259 | A | 10/2000 | Puffenberger et al. |
| 6,471,908 | B1 | 10/2002 | Beckmann |
| 6,500,379 | B1 | 12/2002 | Wrobbel |
| 6,521,167 | B1 | 2/2003 | Beckmann |
| 8,205,311 | B2 | 6/2012 | Woellper et al. |
| 8,475,904 | B2 | 7/2013 | Hawkins et al. |
| 2005/0028471 | A1 | 2/2005 | Levesque et al. |

*Primary Examiner* — Alexander Thomas
(74) *Attorney, Agent, or Firm* — Grossman, Tucker, Perreault & Pfleger, PLLC (57) ABSTRACT

A decorative article is provide which comprises a substrate including a front side, a rear side and a perimeter side, with the perimeter side of the substrate including at least one perimeter corner of the substrate. An elongated slot is formed in the rear side of the substrate. The elongated slot includes at least one slot corner and at least one slot corner extension, with the slot corner extension extending from the slot corner to the perimeter corner of the substrate. A decorative covering which covers the front side, the perimeter side and a peripheral region of the rear side of the substrate, with the decorative covering being located in and terminating the slot including the slot corner and the slot corner extension to conceal a perimeter edge of the decorative covering.

31 Claims, 8 Drawing Sheets

MANUFACTURE OF AN ARTICLE HAVING AN EDGE WRAPPED DECORATIVE COVERING OVERLYING A SUBSTRATE

FIELD

The present disclosure relates to the manufacture of a decorative article, which may function as an interior trim member of a motor vehicle, having a decorative covering overlying a substrate, and more particularly a carpet overlying a substrate.

BACKGROUND

As set forth by U.S. Pat. No. 8,475,904 to Hawkins et al, blow molded hollow articles with a covering can be made by a conventional, blow molding process by inserting a covering in a blow mold. A carpeted load floor may be formed by placing a carpet in the mold and then inflating a parison to form a hollow article with a bonded carpet on one side and along edges. However, the wrapping of the carpet along the edges is limited to the location of the parting line that is usually placed at the mid-point of the thickness of a part for ease of manufacturing. Thus, the edge wrap does not completely cover the side wall of the molded product, and does not extend onto the rear side of the product. Furthermore, the carpet may be thinned at the corners and edges of the upper surface, which may lead to plastic bleed through or poor carpet appearance.

Hawkins et al, also sets forth that another conventional method of attaching a carpet to a plastic component is by means of an adhesive. An article is first molded and a carpet is pre-cut to the desired shape. The carpet is affixed to the plastic in a secondary operation. During this secondary operation the adhesive is placed on one or both surfaces to be bonded. The alignment and placement of carpet is difficult and not exact. The process requires substantial labor and time which makes this process less attractive for automotive manufacturing.

While not particularly mentioned by Hawkins, edge wrapping the carpet onto the rear side of a hollow substrate, such as a blow molded substrate, may be particularly problematic due to the increased thickness of the substrate. What is needed is an edge wrapping structure and method for a hollow substrate, such as a blow molded substrate, which allow a decorative covering to extend onto the rear side of the substrate and be wrapped thereon without puckering of the decorative covering in the corners and with a seam in the corners provided at a repeatable location.

SUMMARY

The present disclosure provides a decorative article which comprises a substrate including a front side, a rear side and a perimeter side, with the perimeter side of the substrate including at least one perimeter corner of the substrate. An elongated slot is formed in the rear side of the substrate. The elongated slot includes at least one slot corner and at least one slot corner extension, with the slot corner extension extending from the slot corner to the perimeter corner of the substrate. A decorative covering which covers the front side, the perimeter side and a peripheral region of the rear side of the substrate, with the decorative covering being located in and terminating the slot including the slot corner and the slot corner extension to conceal a perimeter edge of the decorative covering. In the foregoing manner, the decorative covering does not pucker in the corners of the decorative article.

The present disclosure also provides a method of forming a decorative article comprising forming a substrate, the substrate including a front side, a rear side, and a perimeter side, with the perimeter side of the substrate including at least one perimeter corner of the substrate; an elongated slot formed in the rear side of the substrate, at least a portion of a length of the slot having a contour which is substantially parallel to an outer contour of the perimeter side; and wherein the elongated slot includes at least one slot corner and at least one slot corner extension, the slot corner extension extending from the slot corner to the perimeter corner of the substrate; covering the front side, the perimeter side and a peripheral region of the rear side of the substrate with a first decorative covering, wherein the first decorative covering is located in the slot including the slot corner and the slot corner extension; and wherein the first decorative covering located in the slot including the slot corner and the slot corner extension terminates in the slot including the slot corner and the slot corner extension to conceal a perimeter edge of the first decorative covering.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to FIGS. 1-5, there is shown is a decorative article 10 for a motor vehicle according to the present disclosure, which may be, for example, a load floor, a rear package shelf, a seat back or an instrument panel close-out panel. As best shown by FIG. 2A, decorative article 10 and substrate 20 thereof have a front (first) side 14, an opposing rear (second) side 16 and a perimeter side 18 extending around the article 10/substrate 20. Substrate 20 may have an overall thickness T in a range of 8 mm to 25 mm, and more particularly have an overall thickness T in a range of 10 mm to 20 mm. The increased thickness of the decorative article 10 results in a greater section modulus and bending strength than articles which may be, for example, injection molded at a thickness of 2.5 mm.

Figure 2A:
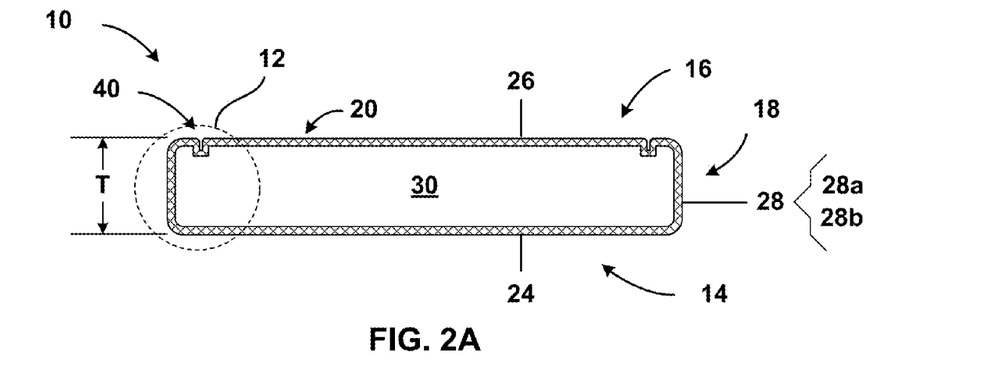
FIG. 2A is a cross-sectional view of the hollow substrate of FIG. 1 taken along line 2-2 of FIG. 1.

Decorative article 10 comprises a substrate 20. As shown in FIG. 2A, substrate 20 may particularly be hollow and made of a thermoplastic material, which may be shaped/formed by blow molding, rotational molding or twin-sheet thermoforming.

Also as shown in FIG. 2A, substrate 20 includes a front wall 24 (corresponding with front side 14), a rear wall 26 (corresponding with rear side 16), and a side wall 28 (corresponding with perimeter side 18), which connects the front wall 24 and rear wall 26 along the perimeter side 18 of the decorative article 10. As shown, front wall 24, rear wall 26 and side wall 28 define internal cavity 30.

Figure 2B:
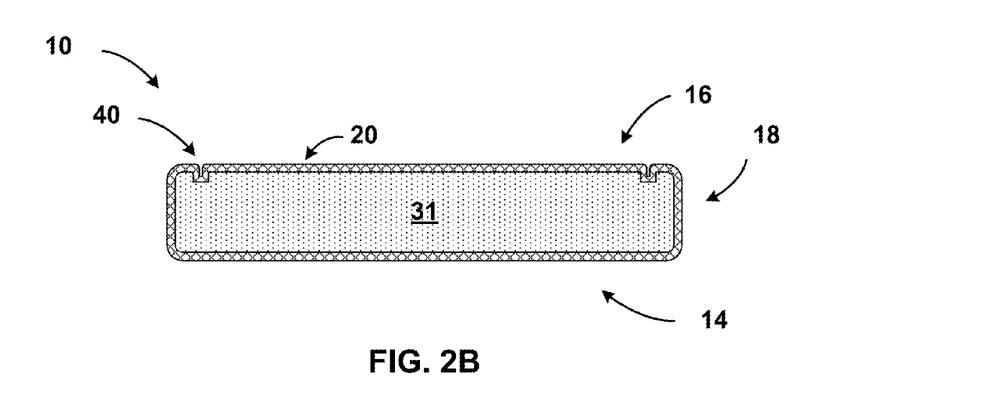
FIG. 2B is a cross-sectional view of another embodiment of a substrate according to the present disclosure taken along line 2-2 of FIG. 1.

In other embodiments, as shown in FIG. 2B, the substrate 20 may be a compression molded fiber core substrate, which may particularly comprise a paper honeycomb core 31 sandwiched between reinforced (e.g. non-woven glass mat) sheeting material for front wall 24, rear wall 26 and side wall 28, such as a "Fiber Core Panel" from Dayton Bag & Burlap. Alternatively, the honeycomb core 21 may be a polypropylene honeycomb panel from Plascore Inc.

Figure 2C:
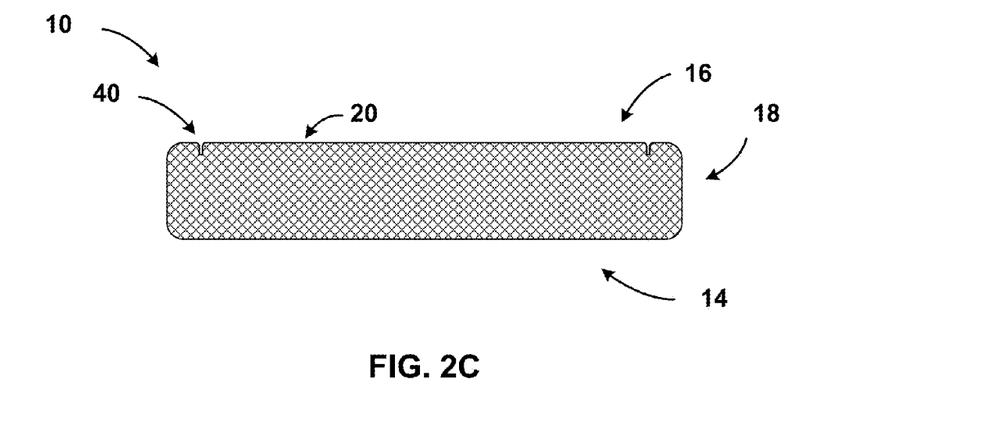
FIG. 2C is a cross-sectional view of another embodiment of a substrate according to the present disclosure taken along line 2-2 of FIG. 1.

In still other embodiments, as shown in FIG. 2C, the substrate 20 may be a reaction injection molded reinforced (e.g. non-woven glass mat) rigid polyurethane foam substrate, having a density in a range of 0.1 g/cm$^3$ to 0.5 g/cm$^3$.

Figure 1:
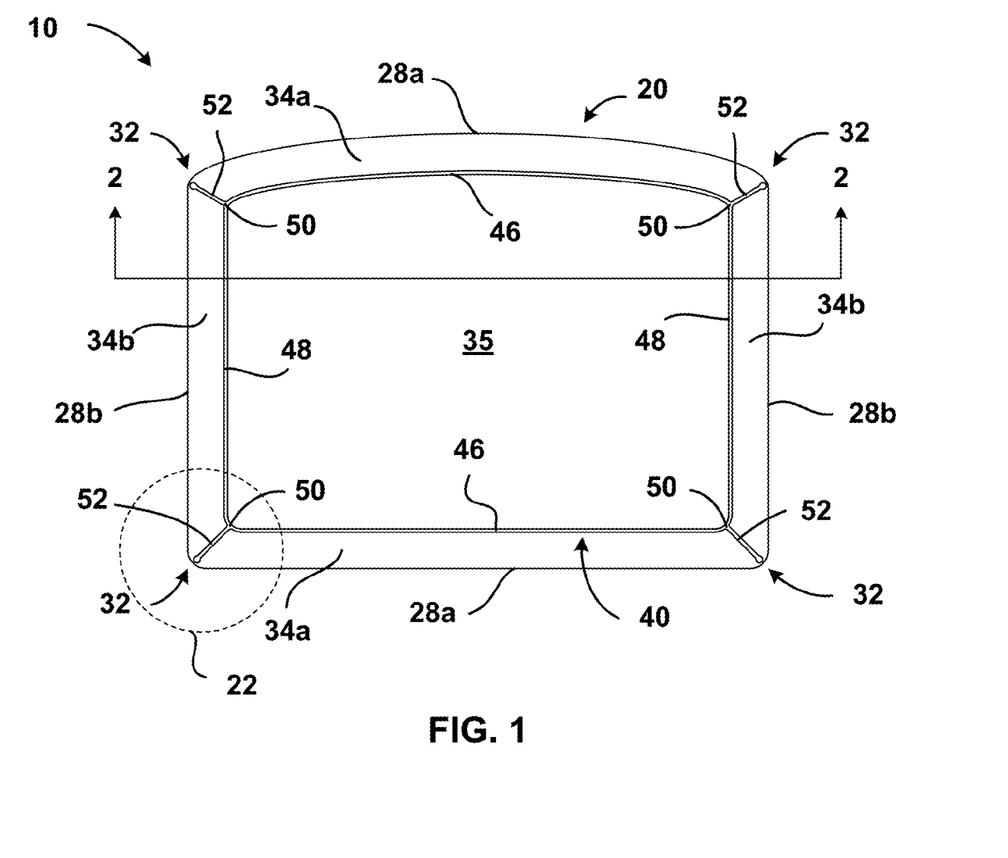
FIG. 1 is a rear plan view of a hollow substrate for a decorative article according to the present disclosure.
Figure 5:
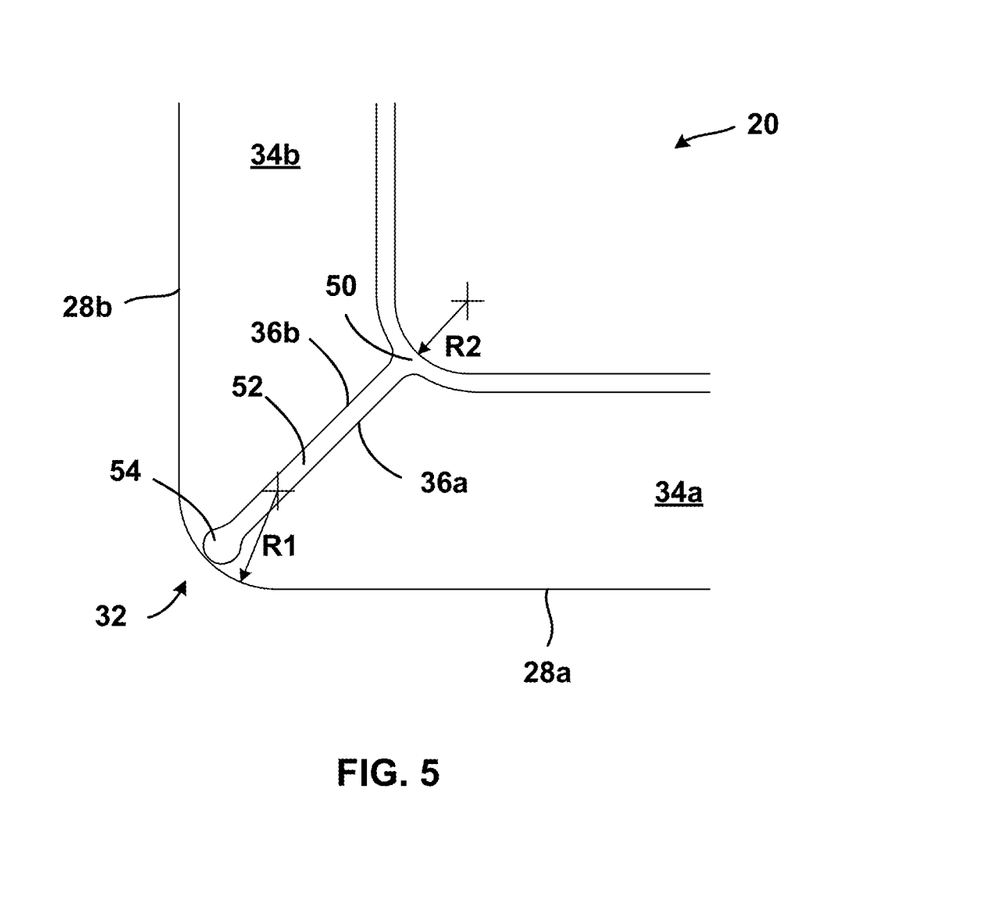
FIG. 5 is a close-up plan view of the corner of the substrate bounded by circle 22 of FIG. 1.

As shown by FIG. 1, the longitudinal (shown as horizontal) portions 28a of the side wall 28 intersect with the lateral (shown as vertical) portions 28b of the side wall 28 at four perimeter corners 32 of the substrate 20. Perimeter corners 32 are particularly rounded corners, and may have a radius R1, as best shown in FIG. 5, of at least 2 mm millimeters, and particularly in a range of 2 to 50 millimeters.

Figure 4:
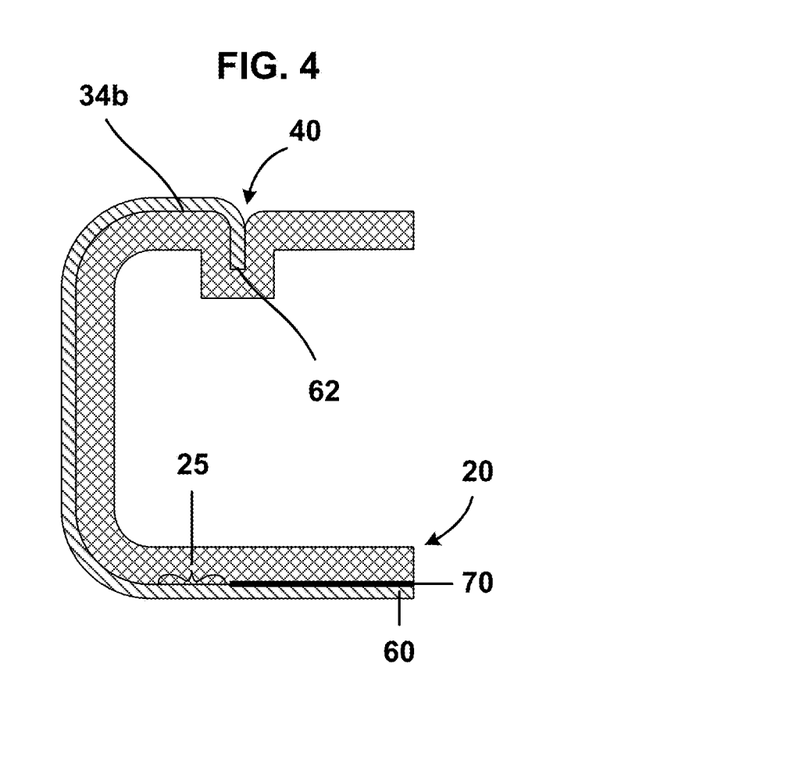
FIG. 4 is a close-up cross-sectional view of the peripheral region of the substrate bounded by circle 12 of FIG. 2A with the overlying decorative covering.
Figure 9:
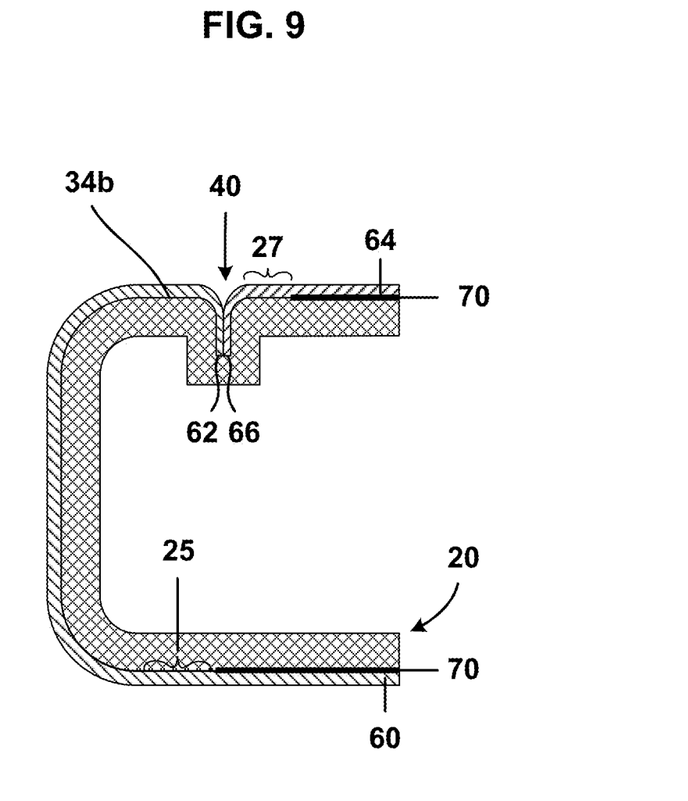
FIG. 9 is a close-up cross-sectional view of the peripheral region of the substrate bounded by circle 12 of FIG. 2A with the overlying decorative covering according to another embodiment of the present disclosure.

As shown in FIG. 4, and as disclosed in greater detail below, a decorative covering 60, which may be, for example a woven or non-woven fabric, such as a carpet or scrim, covers front wall 24, wraps around side wall 28 and covers a peripheral region 34, comprising peripheral sections 34a, 34b, of rear wall 26 of the substrate 20. The covering 60 may have a weight in a range of 20 to 600 g/m$^2$. As shown, in the present embodiment, covering 60 only covers peripheral region 34 of rear wall 26 of the substrate 20. However, in other embodiments disclosed herein, a decorative covering 64, as shown in FIG. 9 and discussed below, may also cover central region 35 such that the rear wall 26 of the substrate 20 is completely covered by decorative covering 60 and 64.

Decorative covering 60 may be bonded to front wall 24 of substrate 20 particularly by use of an adhesive 70, such as a spray adhesive or a hot-melt adhesive. Conversely, the adhesive 70 is not shown to bond the decorative covering overlying side wall 28 (shown as 28a) or the peripheral region 34 (shown as 34a, which may be about 12-50 mm wide) of rear wall 26 of the substrate 20. Furthermore, the adhesive 70 which bonds the decorative covering 60 to the front wall 24 of substrate 20 terminates such that the decorative covering 60 is not bonded to a peripheral region 25 of the front wall 24 of substrate 20, which may also be 12-50 mm wide. In other words, the decorative covering 60 merely overlies the peripheral region 25 of the front wall 24, the side wall 28 and the peripheral region 34 of the rear wall 26 of the substrate 20. Such permits the decorative covering 60 to be formed over corners 32 is a more compliant manner as discussed in greater detail below.

Figure 3:
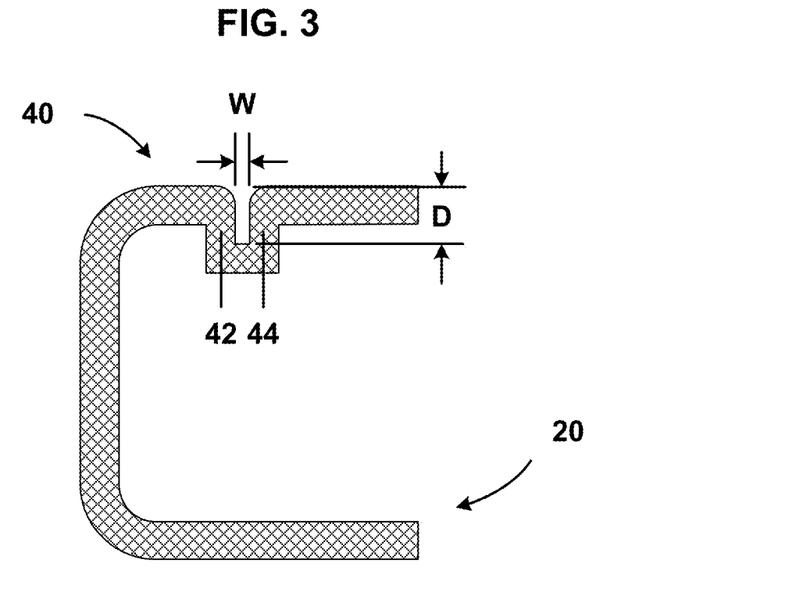
FIG. 3 is a close-up cross-sectional view of the portion of the substrate bounded by circle 12 of FIG. 2A.

As best shown by FIGS. 3 and 4, in order conceal the perimeter edge 62 of the decorative covering 60 on rear side 16 of the decorative article 10, rear wall 26 of the substrate 10 includes an elongated slot 40 defined by a pair of opposing parallel side wall segments 42, 44. As shown, slot 40 may have a width W in a range of 1 to 10 millimeters, dependent upon the thickness of the particular covering, and a depth D in a range of 2 millimeters to a maximum of 2 mm less than the overall panel thickness.

Referring back to FIG. 1, the slot 40 may have a contour which follows the outer contour of side wall 28 and which is, more particularly, substantially parallel (e.g. within 5 degrees) with the outer contour of side wall 28 such that the slot 40 maintains a substantially uniform distance from the adjacent side wall 28. As such, when the perimeter edge 62 of the decorative covering 60 is inserted into and terminates in slot 40, the decorative covering 60 covers peripheral region 34, comprised of longitudinal peripheral sections 34a (shown as horizontal) and lateral peripheral sections 34b (shown as vertical).

As shown, the longitudinal (shown as horizontal) elongated portions 46 of the slot 40 intersect with the lateral (shown as vertical) elongated portions 48 of the slot 40 at four slot corners 50 to form a continuous loop. Slot corners 50 are particularly rounded corners having a radius R2 of at least 2 millimeters, and particularly in a range of 2 to 50 millimeters.

As best shown by FIGS. 1 and 5, at the four slot corners 50, the elongated slot 40 further includes a slot corner extension 52 which extends from the slot corner 50 to the perimeter corner 32. As shown by FIG. 5, opposing peripheral sections 34a and 34b of peripheral region 34 terminate in edges 36a and 36b of the slot corner extension 52.

As best shown by FIG. 5, each of the corner extensions 52 may include a bulbous end portion 54 adjacent the perimeter corner 32 of the substrate 20 which is wider than the portion of the length of the corner extension 52 adjacent slot corner 50. As shown, bulbous end portion 54 is semi-circular. Furthermore, for the two perimeter corners 32 which are shown as 90 degree corners (i.e. the lower perimeter corners 32 of FIG. 1), the slot corner extensions 52 bisect both the perimeter corners 32 and the corresponding slot corner 50 into two symmetrical halves.

Figure 6:
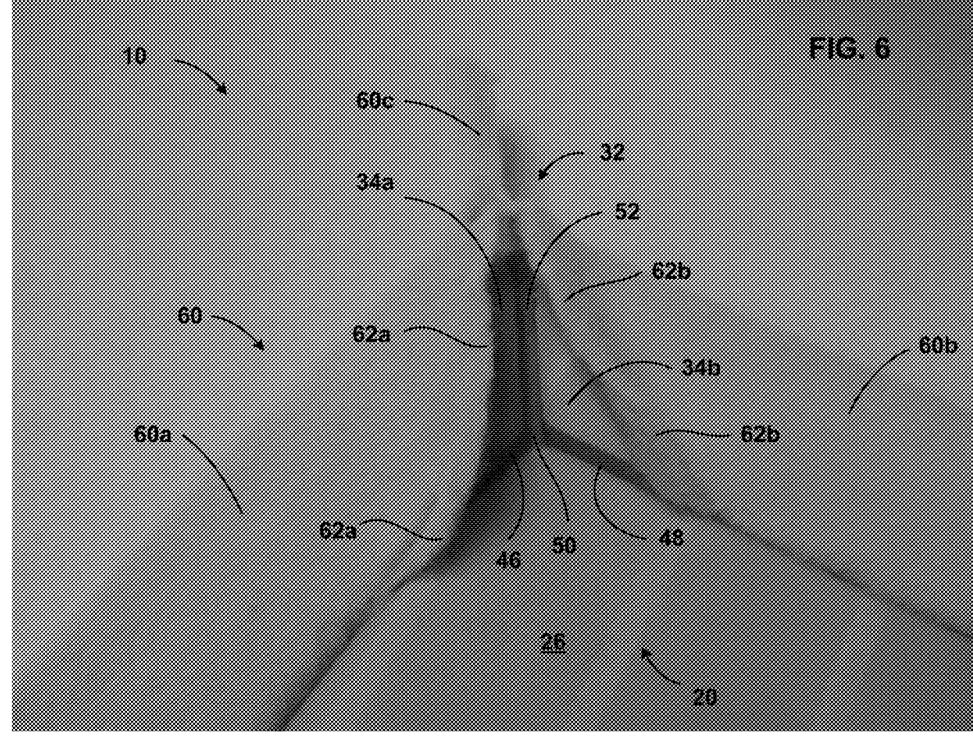
FIG. 6 is a close-up plan view of the corner of the substrate with the decorative covering being wrapped on the rear side of the substrate and the perimeter edge of the decorative covering being concealed in an elongated slot.

Referring now to FIGS. 4 and 6, as set forth above, adhesive 70 bonds the decorative covering 60 to the front wall 24 of substrate 20, which terminates such that the decorative covering 60 is not bonded to a peripheral region 25 of the front wall 24 of substrate 20. Once the decorative covering 60 is bonded to the front wall 24 of substrate 20, the decorative covering 60 is first wrapped/covered over side wall 28 of the substrate 28, and then over peripheral region 34 of rear wall 26 of substrate 20.

As shown by FIG. 6, the portion of decorative covering 60 which wraps over the peripheral region 34 of the substrate 20 includes first peripheral portion 60a, second peripheral portion 60*b*, and intermediate peripheral portion 60*c* between the first peripheral portion 60*a* and the second peripheral portion 60*b*. As shown, intermediate portion 60*c* is in the form of a tongue having a width at least half as wide as the slot corner extension 32 and at least 25% as long, but no more than twice as long, as the slot corner extension 32.

Starting from the middle of each perimeter side 18 of decorative article 10, the perimeter edge 62 of the decorative covering 60 is inserted/located into elongated slot 40, and such insertion is continued towards the slot corners 50. More particularly, at the slot corners 50, a first peripheral portion 60*a* of the decorative covering 60 will cover first peripheral section 34*a* of peripheral region 34 of rear wall 26 and will terminate in elongated portion 46 of slot 40, as well as slot corner 50 and slot corner extension 52, to conceal the first peripheral portion perimeter edge 62*a*. Similarly, a second peripheral portion 60*b* of the decorative covering 60 will cover second peripheral section 34*b* of peripheral region 34 of rear wall 26 and will terminate in elongated portion 48 of slot 40, as well as slot corner 50 and slot corner extension 52, to conceal the second peripheral portion perimeter edge 62*b*.

In addition, the intermediate peripheral portion 60*c* between the first peripheral portion 60*a* and the second peripheral portion 60*b* will be located in the slot corner extension 52 and be located beneath the first peripheral portion 60*a* and the second peripheral portion 60*b* in the slot corner extension 52, which may also temporarily hold the intermediate peripheral portion 60*c* in place.

Figure 7:
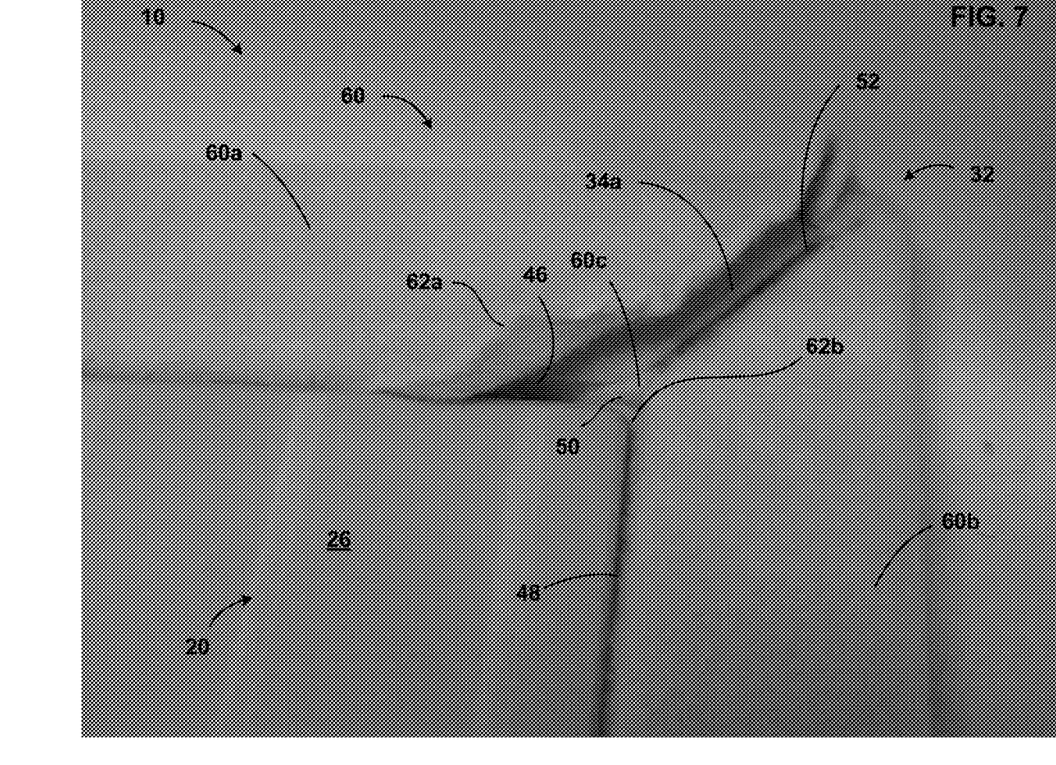
FIG. 7 is a close-up plan view of the corner of the substrate with the perimeter edge of the decorative covering concealed in the elongated slot along one perimeter side of the decorative article.

Referring now to FIG. 7, depending on the cut and stretch of the decorative covering 60 when wrapping over side wall 18 and rear peripheral region 34 of the substrate 20, the quantity of the decorative covering 60 which is to be concealed in the elongated slot 40, including the slot corners 50 and slot corner extensions 52, may vary from part to part. However, the elongated slot 40, including the slot corner 50 and slot corner extension 52, offers the ability accommodate varying lengths of the decorative covering 60 in each corner 32 of the substrate 20 therein, while still providing a consistent appearance of the decorative covering therein from part to part.

For example, ordinarily the intermediate peripheral portion 60 may first be inserted into slot corner extension 52 before either of the first peripheral portion 60*a* or the second peripheral portion 60*b*. In this manner, the intermediate peripheral portion 60 may occupy the bottom of the slot corner extension 52. As such, in the event the length of the first peripheral portion 60*a* and/or the second peripheral portion 60*b* in the slot corner extension 52 does not have sufficient length to cover the bottom of the slot corner extension 52, the intermediate peripheral portion 60 covers the bottom of the slot corner extension 52 so the substrate is not visible in the slot corner extension 52.

Alternatively, if the length of the first peripheral portion 60*a* and/or the second peripheral portion 60*b* in the slot corner extension 52 is longer than ordinarily expected, possibly by increased stretching of the first peripheral portion 60*a* and/or the second peripheral portion 60*b*, such may merely be folded and inserted in the slot corner extension 52, thus accommodate varying lengths of the decorative covering 60.

Furthermore, by placing the intermediate peripheral portion 60*c* into the slot corner extension 52 before either of the first peripheral portion 60*a* or the second peripheral portion 60*b*, the intermediate peripheral portion 60*c* may be used to pull the decorative covering 60 over the substrate corner taught such that no perimeter edge 62 of the decorative covering 60 is visible on the sidewall 18 of substrate corner 32. Furthermore, once the first peripheral portion 60*a* or the second peripheral portion 60*b* are located in the slot corner extension 52, such may apply pressure to the intermediate peripheral portion 60 to inhibit such from sliding out of the slot corner extension 52.

Figure 8:
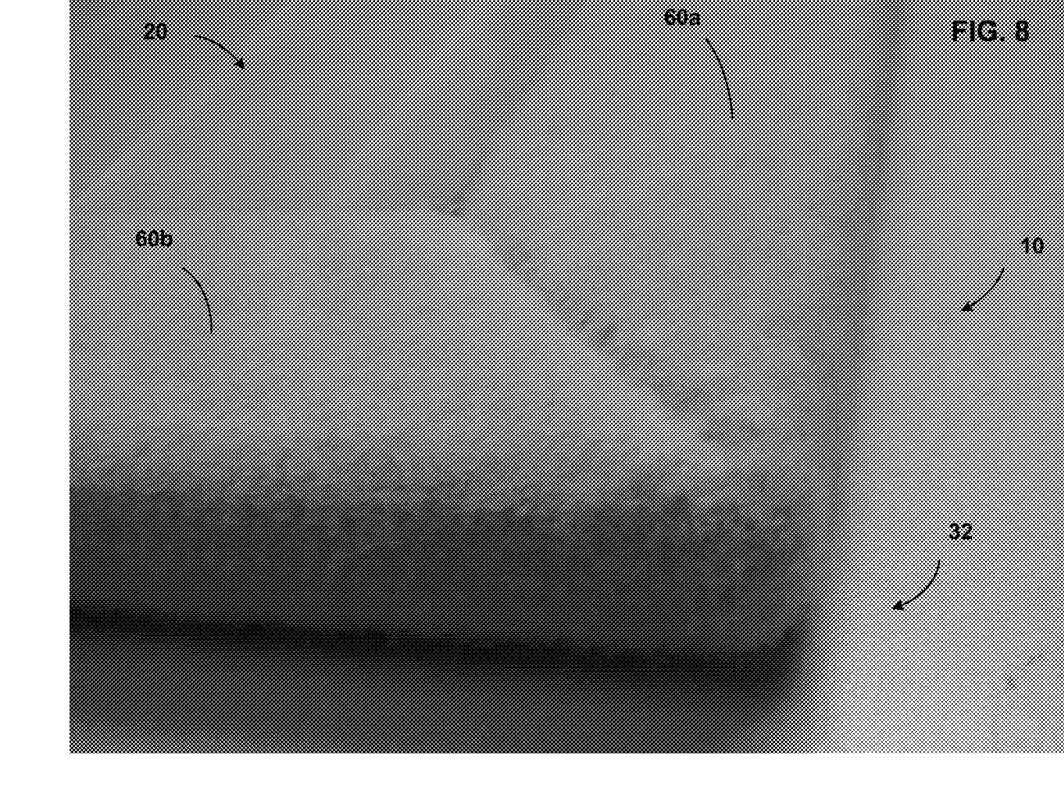
FIG. 8 is a close-up plan view of the corner of a finished decorative article with the perimeter edge of the decorative covering completely concealed in an elongated slot.

As shown by FIG. 7, the intermediate peripheral portion 60*c* has already be inserted in to the slot corner extension 32, along with second peripheral portion 60*b* of decorative covering 60 to conceal second peripheral portion perimeter edge 62*b*. As shown in FIG. 8, the first peripheral portion 60*a* of decorative covering 60 has also been inserted into slot corner extension 32 to conceal first peripheral portion perimeter edge 62*a* of decorative covering 60.

Thereafter, once the perimeter edge 62 of the decorative covering 60 has been fully concealed in the elongated slot 40, including the slot corners 50 and slot corner extensions 52, the decorative covering 60 may then be permanently fastened in such by ultrasonic welding or hot-air staking (heat staking). More particularly, with regards to ultrasonic welding, a welding horn may be placed in or proximate the elongated slot 40 positioned anywhere from the slot to the outer edge of the substrate, including the slot corners 50 and slot corner extensions 52 to ultrasonically weld the decorative covering 60 in such to the substrate 20 by applying pressure thereto. With regards to heat staking, hot air may be directed into or proximate the elongated slot to heat the substrate 20 into a melt state, and once suitably heated therein, an anvil may press the decorative covering 60 into the substrate 20 and thereafter allow the two components to cool and resolidify.

Alternatively, the decorative covering 60 may be fastened to the substrate 20 in the elongated slot 40, including the slot corners 50 and slot corner extensions 52 by applying a adhesive over the decorative covering 60 in the elongated slot 40, including the slot corners 50 and slot corner extensions 52. The adhesive, such as a hot melt, may flow through the porous structure (e.g. carpet) of the decorative covering 60 to bond with the substrate 20, while at the same time bonding to the decorative covering 60 (e.g. fibers of the carpet).

Alternatively, the decorative covering 60 may be fastened to the substrate 20 in the elongated slot 40, including the slot corners 50 and slot corner extensions 52 by mechanically joining the decorative covering 60 in the elongated slot 40, including the slot corners 50 and slot corner extensions 52, with a mechanical fastener, such as staples.

In other embodiments, it should be understood that slot 40 may not necessarily be provided in the form of a continuous loop, or continuously follow the outer contour of the side wall 28. In other words, for example, while shown extending along all four perimeter sides 18 of the decorative article 10, slot 40 may only follow the outer contour of the side wall 28 along one, two or three of perimeter sides 18 of the decorative article 10. In such instance, when the slot 40 extends along three of the perimeter sides 18 of the decorative article 10, it may have a U-shape, and when the slot 40 extends along two of the perimeter sides 18 of the decorative article 10, it may have an L-shape.

In other embodiments, as shown in FIG. 9, a second decorative covering 64 may be used to cover the central region 35 of the rear wall 26 of substrate 20 within the confines of the continuous loop of slot 40. Decorative covering 64 may be the same or a different covering from decorative covering 60. For example, decorative covering 64 and decorative covering 60 may have different colors.

Similar to decorative covering 60, decorative covering 64 may be bonded to the central region 35 of the rear wall 26 of substrate 20 particularly by use of an adhesive 70, such as a spray adhesive or a hot-melt adhesive. The adhesive 70 may completely cover central region 35, or may partially cover central region 35 except for a continuous narrow band 27 of the central region 35 closest slot 40 having a width in a range of 1 to 10 mm.

Also similar to decorative covering 60, a perimeter edge 66 of decorative covering 64 may be inserted in slot 40 and terminate in slot 40 to conceal the perimeter edge 66. The perimeter edge 66 of decorative covering 64 may be inserted in slot before or after the perimeter edge 62 of decorative covering 60 is inserted and concealed in slot 40. Once the perimeter edges 62, 66 of the decorative coverings 60, 64 have been fully concealed in the elongated slot 40, the decorative coverings 60, 64 may be permanently fastened in slot 40 at the same time by welding, heat staking, adhesive or mechanical fastener as discussed above. Alternative, decorative covering 64 may be fastened within elongated slot before or after decorative covering 60 is bonded within elongated slot 40. In the foregoing manner, all surfaces of the substrate 20 would now be covered with a decorative covering.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A decorative article comprising:
   a substrate including a front side, a rear side, and a perimeter side;
   the perimeter side of the substrate including at least one perimeter corner of the substrate;
   an elongated slot formed in the rear side of the substrate, at least a portion of a length of the slot having a contour which is substantially parallel to an outer contour of the perimeter side;
   wherein the elongated slot includes at least one slot corner and at least one slot corner extension, the slot corner extension extending from the slot corner to the perimeter corner of the substrate;
   a first decorative covering which covers the front side, the perimeter side and a peripheral region of the rear side of the substrate;
   wherein the first decorative covering is located in the slot including the slot corner and the slot corner extension; and
   wherein the first decorative covering located in the slot including the slot corner and the slot corner extension terminates in the slot including the slot corner and the slot corner extension to conceal a perimeter edge of the first decorative covering.

2. The decorative article of claim 1 wherein:
   the slot corner extension widens into a bulbous portion adjacent the perimeter corner of the substrate.

3. The decorative article of claim 2 wherein:
   the bulbous portion is semi-circular.

4. The decorative article of claim 1 wherein:
   the slot corner extension bisects at least one of the perimeter corner and the slot corner into two symmetrical halves.

5. The decorative article of claim 1 wherein:
   the peripheral region of the rear side of the substrate comprises a first peripheral section and a second peripheral section, wherein the first peripheral section and the second peripheral section each terminate in an edge of the slot corner extension;
   the first decorative covering includes a first peripheral portion having a first peripheral portion perimeter edge, a second peripheral portion having a second peripheral portion perimeter edge and a intermediate peripheral portion between the first peripheral portion and the second peripheral portion,
   the first peripheral portion covers the first peripheral section of the rear side and terminates in the slot corner extension to conceal the first peripheral portion perimeter edge;
   the second peripheral portion covers the second peripheral section of the rear side and terminates in the slot corner extension to conceal the second peripheral portion perimeter edge; and
   the intermediate peripheral portion between the first peripheral portion and the second peripheral portion is located in the slot corner extension beneath the first peripheral portion and the second peripheral portion.

6. The decorative article of claim 1 wherein:
   the substrate includes a plurality of perimeter corners;
   the slot includes a plurality of slot corners and slot corner extensions;
   wherein each slot corner extension extends from one of the slot corners to one of the perimeter corners; and
   wherein the first decorative covering is located in each of the slot corners and corner extensions; and
   wherein the first decorative covering located in each of the slot corners and corner extensions terminates in the slot corners and slot corner extensions to conceal the perimeter edge of the first decorative covering.

7. The decorative article of claim 1 wherein:
   the slot has a width in a range of 1 to 10 millimeters, and a depth of at least 2 millimeters.

8. The decorative article of claim 1 wherein:
   the perimeter corner is a rounded corner; and
   the rounded perimeter corner is rounded with a radius in a range of 2 to 50 millimeters.

9. The decorative article of claim 1 wherein:
   the slot corner is a rounded corner; and
   the rounded slot corner is rounded with a radius in a range of 2 to 50 millimeters.

10. The decorative article of claim 1 wherein:
    the slot formed in the rear side of the substrate follows an outer contour of the perimeter side of the substrate along at least a portion of a perimeter side wall of the substrate.

11. The decorative article of claim 1 wherein:
    the slot formed in the rear side of the substrate forms a continuous loop.

12. The decorative article of claim 1 wherein:
    the substrate is hollow.

13. The decorative article of claim 1 wherein:
    the substrate is one of a blow molded substrate, rotational molded substrate, thermoformed substrate, compression molded substrate and a foam molded substrate.

14. The decorative article of claim 1 wherein:
    the substrate is formed of at least one of rigid foam and a honeycomb core.

15. The decorative article of claim 1 wherein:
    the first decorative covering is a woven or nonwoven fabric.

16. The decorative article of claim 15 wherein:
    the fabric is a carpet.

17. The decorative article of claim 1 wherein:
the first decorative covering has a weight of 20 to 600 g/m².

18. The decorative article of claim 1 wherein:
the first decorative covering located within the slot is fastened to the substrate.

19. The decorative article of claim 1 wherein:
the first decorative covering is at least one of welded, heat staked, adhesive bonded and mechanically fastened to the substrate.

20. The decorative article of claim 1 further comprising:
a second decorative covering which covers a central region of the rear side of the substrate;
wherein the second decorative covering is located in the slot including the slot corner; and
wherein the second decorative covering located in the slot including the slot corner terminates in the slot including the slot corner.

21. The decorative article of claim 20 wherein:
the second decorative covering located within the slot is fastened to the substrate.

22. The decorative article of claim 20 wherein:
the second decorative covering is at least one of welded, heat staked, adhesive bonded and mechanically fastened to the substrate.

23. The decorative article of claim 1 wherein:
the decorative article is a motor vehicle interior article.

24. A method of forming a decorative article comprising:
forming a substrate, the substrate including a front side, a rear side, and a perimeter side;
the perimeter side of the substrate including at least one perimeter corner of the substrate;
an elongated slot formed in the rear side of the substrate, at least a portion of a length of the slot having a contour which is substantially parallel to an outer contour of the perimeter side; and
wherein the elongated slot includes at least one slot corner and at least one slot corner extension, the slot corner extension extending from the slot corner to the perimeter corner of the substrate;
covering the front side, the perimeter side and a peripheral region of the rear side of the substrate with a first decorative covering,
wherein the first decorative covering is located in the slot including the slot corner and the slot corner extension; and
wherein the first decorative covering located in the slot including the slot corner and the slot corner extension terminates in the slot including the slot corner and the slot corner extension to conceal a perimeter edge of the first decorative covering.

25. The method of claim 24 wherein:
the peripheral region of the rear side of the substrate comprises a first peripheral section and a second peripheral section, wherein the first peripheral section and the second peripheral section each terminate in an edge of the slot corner extension;
the first decorative covering includes a first peripheral portion having a first peripheral portion perimeter edge, a second peripheral portion having a second peripheral portion perimeter edge and an intermediate peripheral portion between the first peripheral portion and the second peripheral portion;
the first peripheral portion covers the first peripheral section of the rear side and terminates in the slot corner extension to conceal the first peripheral portion perimeter edge;
the second peripheral portion covers the second peripheral section of the rear side and terminates in the slot corner extension to conceal the second peripheral portion perimeter edge; and
the intermediate peripheral portion between the first peripheral portion and the second peripheral portion is located in the slot corner extension beneath the first peripheral portion and the second peripheral portion.

26. The method of claim 24 wherein:
the substrate includes a plurality of perimeter corners;
the elongated slot includes a plurality of slot corners and slot corner extensions 52;
wherein each slot corner extension extends from one of the slot corners to one of the perimeter corners; and
wherein the first decorative covering is located in each of the slot corners and corner extensions; and
wherein the first decorative covering located in each of the slot corners and corner extensions terminates in the slot corners and corner extensions to conceal the edge of the first decorative covering.

27. The method of claim 24 wherein:
the first decorative covering located within the slot is fastened to the substrate.

28. The method of claim 24 wherein:
the first decorative covering is at least one of welded, heat staked, adhesive bonded and mechanically fastened to the substrate.

29. The method of claim 24 further comprising:
covering a central region of the rear side of the substrate with a second decorative covering;
wherein the second decorative covering is located in the slot including the slot corner; and
wherein the second decorative covering located in the slot including the slot corner terminates in the slot including the slot corner.

30. The method of claim 29 wherein:
the second decorative covering located within the slot is fastened to the substrate.

31. The method of claim 29 wherein:
the second decorative covering is at least one of welded, heat staked, adhesive bonded and mechanically fastened to the substrate.

\* \* \* \* \*